United States Patent [19]

Luetzow

[11] 4,229,256
[45] Oct. 21, 1980

[54] CORRUGATED THIMBLE TUBE FOR CONTROLLING CONTROL ROD DESCENT IN NUCLEAR REACTOR

[75] Inventor: Howard J. Luetzow, Dearborn, Mich.

[73] Assignee: UOP Inc., Des Plaines, Ill.

[21] Appl. No.: 865,145

[22] Filed: Dec. 28, 1977

[51] Int. Cl.² .................................................. G21C 7/16
[52] U.S. Cl. .................................................... 176/36 S
[58] Field of Search ........................... 176/36 S, 36 R; 188/297, 316

[56] References Cited

U.S. PATENT DOCUMENTS

| 3,301,140 | 1/1967 | Beck | 188/297 |
| 3,562,109 | 2/1971 | Bezold et al. | 176/36 SA |
| 3,628,638 | 12/1971 | Curchack | 188/316 |
| 3,855,060 | 12/1974 | Dietrich et al. | 176/36 SA |

FOREIGN PATENT DOCUMENTS

| 1250020 | 9/1967 | Fed. Rep. of Germany | 176/36 S |
| 1120705 | 7/1956 | France | 188/316 |
| 1352881 | 1/1964 | France | 176/36 S |
| 1451407 | 7/1966 | France | 176/36 SA |
| 95560 | 3/1971 | France | 176/368 A |

Primary Examiner—Samuel W. Engle
Assistant Examiner—S. A. Cangialosi
Attorney, Agent, or Firm—James R. Hoatson, Jr.; Barry L. Clark; William H. Page, II

[57] ABSTRACT

Improved shock absorber for slowing down the descent of a control rod in a liquid cooled reactor core at a controlled rate uses a thimble tube which has a corrugated section at its lower end to distribute the control rod deceleration forces over an extended distance in a "scram" situation. In a preferred embodiment, the corrugations have a lesser internal diameter at the lower end of the thimble tube than at the top to increase the rate of deceleration as the control rod aproaches the bottom of the core. In several modifications, the corrugation pitch and/or depth is varied over the length of the corrugated surface.

2 Claims, 6 Drawing Figures

CORRUGATED THIMBLE TUBE FOR CONTROLLING CONTROL ROD DESCENT IN NUCLEAR REACTOR

BACKGROUND OF THE INVENTION

The invention relates to a shock absorber for slowing down the descent of a control rod within a thimble tube in a nuclear reactor and particularly to an improved thimble tube construction.

As well set forth in various prior art patents such as U.S. Pat. Nos. 3,562,109, 3,773,617, 3,980,519, 3,992,255 and 4,028,180, it is conventional to provide control rods for adjusting the operating conditions of nuclear reactors. The core of the reactor typically contains a grid arrangement of thimble tubes which contain reactor coolant and are interspersed among the fuel rods. Positioned in telescopic relationship with each thimble tube is a reactor control rod which contains a neutron-absorbing material. The control rod is displaceable in a known controlled manner or by gravity between an upper position in which the absorbing portion is located outside the intense neutron flux zone of the reactor and a lower position in which the absorbing portion is located within the intense neutron flux zone of the reactor.

Generally, the control rods can be lowered to slow down the reaction to varying degrees. For safety purposes, the control rods are also mounted in such a manner that all of them may be dropped simultaneously by gravity in order to effect an immediate shutdown of the reactor. In order to cushion the impact in such a "scram" situation, a shock absorbing means is commonly built into the thimble tube. Perhaps the simplest form of shock absorber is provided by forming a necked-in area in the thimble tube so that the associated control rod can drop quickly to the necked-in region and then be resisted in its further movement by the fact that the liquid displaced as the rod drops into the closed end thimble tube must move through the narrow space between the rod and the necked-in wall portion. Where a single restriction is provided in the thimble tube, rather substantial resistance forces are developed which are undesirable. In order to reduce these forces, the aforementioned U.S. Pat. No. 3,562,109 proposes the use of a plurality of necked-in regions which cause the control rod to slow its descent in a number of steps rather than very abruptly. Thus, the reaction forces are absorbed relatively uniformly over an extended distance of travel. Although the aforementioned multiple restriction construction provides adequate adsorption of forces, it is rather expensive to construct and the elongated necked-in regions provide some opportunity for foreign particles to become jammed where they could interfere with the free descent of the rods.

SUMMARY

It is among the objects of the present invention to provide an improved thimble tube construction which will provide a controlled descent for a control rod while minimizing the reaction forces which must be absorbed by the thimble tube and greatly reducing the possibility that a foreign particle could interfere with the free descent of a control rod.

These and other objects of the invention are achieved by the construction proposed herein wherein a thimble tube is formed with helically corrugated internal walls which cooperate with a control rod contained therein in a scram situation to provide a progressively increasing hydraulic restraining force as each adjacent corrugation is encountered. In a preferred embodiment, the depth of the corrugations is greater at the lower end of the thimble tube than further up so that the annular gap between the thimble tube and control rod becomes smaller and thus accelerates the stopping rate as the control rod approaches the bottom of its path of descent. The variation of corrugation depth can be either step-wise or uniform. In other embodiments, the corrugation pitch and depth are constant, with the corrugations in one case being continuous and in another, interrupted by smooth sections. In yet another embodiment, the corrugation pitch is varied while the depth remains constant.

DESCRIPTION OF THE PREFERRED EMBODIMENTS

Figure 1:
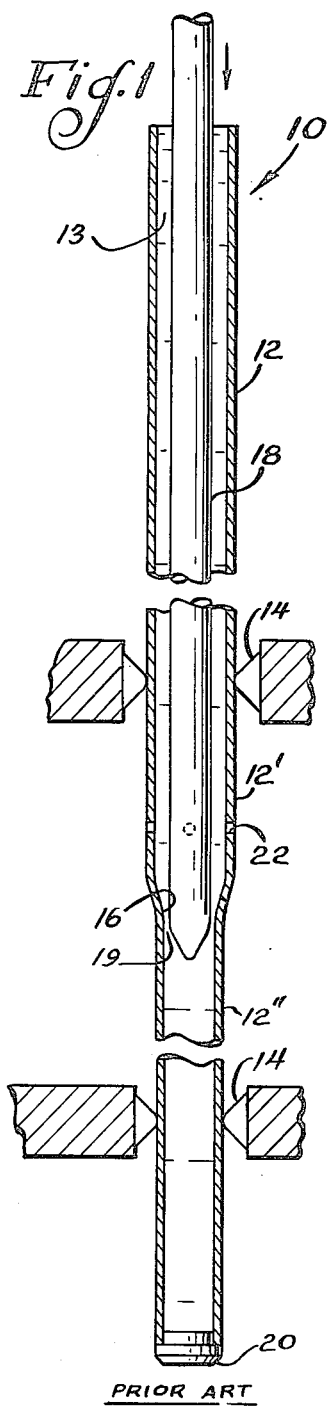
FIG. 1 is a side elevational view, partly in section, which illustrates one prior art example of a thimble tube-control rod assembly which can function as a shock absorber to slow down the descent of the control rod.

Referring to FIG. 1, a prior art control rod assembly is indicated generally at 10. The assembly includes an outer thimble tube 12 which is adapted to be supported in a grid-like arrangement in a reactor core (not shown) by a plurality of support fingers 14. The thimble tube 12 includes an upper portion 12' having a substantially greater diameter than the control rod 18 which is telescopically positioned within the thimble tube 12. The lower portion 12" of the thimble tube has a greatly reduced diameter which is slightly greater than the outer diameter of the control rod 18 so as to define an annular space 19 between the control rod and the lower tube section 12". A typical outer diameter for the control rod 18 is 0.381" while a typical inner diameter for portion 12" is 0.397". Since there is water or other coolant 13 both inside and outside the thimble tube 12 and since the lower end of the thimble 12 is closed off by a plug 20 it is obvious that the coolant will be forced upwardly through the annular space 19 as it is displaced by the downward movement of the control rod 18. One or more vent holes 22 formed in the thimble tube portion 12' permit the displaced coolant to be expelled from the tubes 12 rather than be forced to lift the entire narrow column of coolant located in the upper portion of the tube.

As previously discussed, a thimble tube such as that shown in FIG. 1 which has a single necked-in region 16 can be characterized as having rather substantial radial forces applied to the necked-in region 16 and the lower tubular section 12" when the control rod 18 is dropped in a scram situation. Furthermore, though it is not likely, the typically very small dimension of the annular space 19 makes it conceivably possible for a foreign particle to become jammed between the rod 18 and the thimble portion 12" where it could slow the descent of the control rods.

FIGS. 2–6 illustrate several alternative constructions for the thimble tubes 12 of FIG. 1 which, it is believed, will not only provide a controlled descent for a control rod which will spread out the required stopping forces over a much greater distance than the prior art. The construction should also be more economical to produce and should eliminate any possibility of being jammed by foreign particles since any such particle could easily move into the enlarged diameter portion of each corrugation.

Figure 2:
FIG. 2 illustrates a partially fragmented and partially sectioned side view of a thimble tube in accordance with my invention which incorporates corrugations having a constant pitch but three different corrugation depths which reduce the internal diameter of the tube as one proceeds toward its bottom (shown at the right of the figure)

In FIG. 2, the tube 212 includes a plurality of corrugations 215 which have a constant pitch $P_2$. However, the corrugations have a depth $d_2$ in the region ab connecting points A and B, a depth $d'_2$ in the region bc connecting points B and C, and a depth $d''_2$ in the region cd connecting points C and D. When used with a control rod having the same diameter previously mentioned for FIG. 1, i.e., 0.381", the respective diameters $d_2$, $d'_2$, and $d''_2$ may be 0.424", 0.420", and 0.394", respectively. As the control rod falls within thimble tube 212 it will slow down slightly as it encounters the root portion of each corrugation 215 from point A to point B. The liquid being displaced can move through both the narrow constriction between the control rod and corrugation root and in a spiral inside the corrugations. The rod will slow down even more as it encounters the greater resistance to liquid displacement produced by the reduced diameter corrugations at points B and C. Generally, the corrugated portion of the tube 212 is a small fraction of its overall length. For example, where the entire tube 212 has a length of about 153", the segments ab, bc and cd may each have a length of about 7.2".

Figure 3:
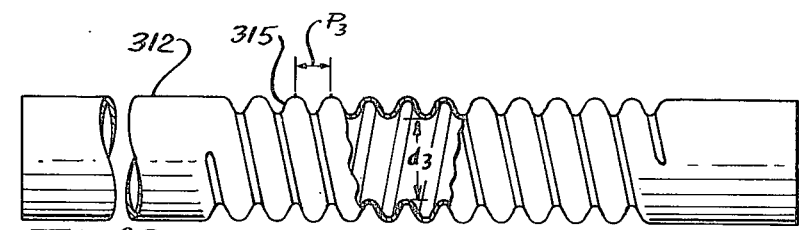
FIG. 3 is a view similar to FIG. 2 but showing a modification where the corrugations are of uniform pitch and depth throughout their length.

In FIG. 3, the modified tube 312 has corrugations 315 which have a constant pitch $P_3$ and a constant depth $d_3$. In order to provide the same overall shock absorber effect as the FIG. 2 embodiment, the diameter $d_3$ would have to be somewhere between $d'_2$ and $d''_2$ in FIG. 2. Thus, the initial load absorbed by the tube in the vicinity of the first corrugation in this embodiment would be substantially greater than in the FIG. 2 embodiment.

Figure 4:
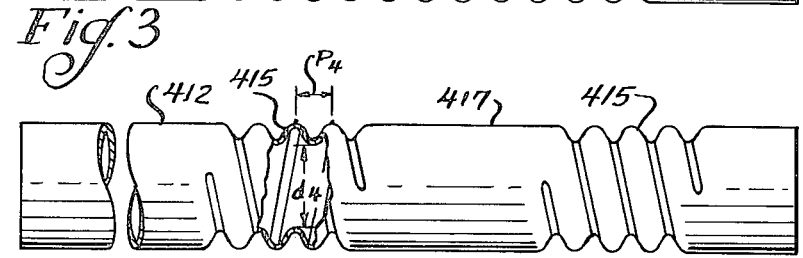
FIG. 4 is a modification similar to FIG. 3 except that the corrugations are interrupted along their length by one or more plain tube sections.

In FIG. 4, the modified tube 412 is identical to FIG. 3 in that the corrugations 415 have a constant pitch $P_4$ and a constant depth $d_4$. However, the corrugations 415 are periodically interrupted by plain, large diameter areas 417 which would alter the rate at which the movement of the control rod slows down.

Figure 5:
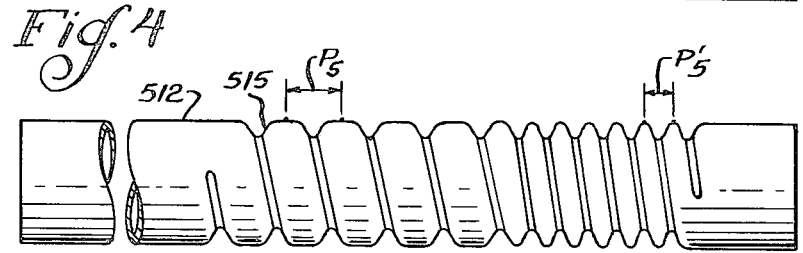
FIG. 5 is a modification which is similar to FIG. 3 except that the pitch of the corrugations decreases as the bottom of the tube is approached.

In FIG. 5, the tube 512 has corrugations 515 which have constant depth but a pitch that varies from $P_5$ to $P'_5$. Since the slowing pulse contributed by each successive corrugation progressively slows down the rate of descent of the control rod, making the corrugations of progressively smaller pitch tends to produce slowing pulses which react with the control rod in equal time increments.

Figure 6:
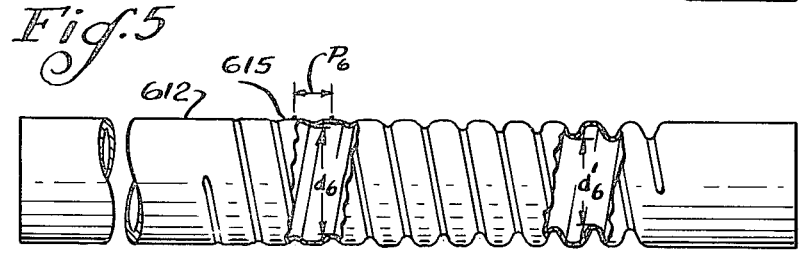
FIG. 6 is a modification similar to FIG. 3 except that the depth of the corrugations varies uniformly from one end thereof to the other such that the internal tube diameter is less at the bottom end of the tube corrugations than it is at the top.

The FIG. 6 embodiment is similar to FIG. 2 in that the tube 612 has corrugations 615 of constant pitch. However, the corrugation depth is varied uniformly from a diameter of $d_6$ to a diameter of $d''_6$. This design provides a maximum of energy absorption in the shortest distance for a given maximum when compared to the other embodiments.

I claim as my invention:

1. In a shock absorber for a control rod used in a nuclear reactor cooled by liquid, the improvement comprising a guide or thimble tube for said control rod, said thimble tube being internally helically corrugated along at least one extended axial portion near its lower end, said helically corrugated portion having internal diameters of smaller distance at the lower end than at the upper end of said corrugated portion and a progressively smaller pitch of corrugation from the top to the bottom of said corrugated portion and cooperating with the outer wall portion of the lower end of said control rod to brake the descent of said control rod with progressively increasing hydraulic restraining force provided by the liquid coolant in the annular space between the thimble or guide tube and said control rod as each adjacent progressively smaller section of corrugation is encountered.

2. The shock absorber of claim 1 wherein said thimble tube includes a plurality of helically corrugated portions spaced by smooth portions having a greater internal diameter than that of either adjacent corrugated portion.

* * * * *